United States Patent
Dallmer-Zerbe et al.

(10) Patent No.: US 11,277,076 B2
(45) Date of Patent: Mar. 15, 2022

(54) CONVERTER AND METHOD FOR THE CONTROL THEREOF

(71) Applicant: SIEMENS AKTIENGESELLSCHAFT, Munich (DE)

(72) Inventors: Kilian Dallmer-Zerbe, Bubenreuth (DE); Sebastian Semmler, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/820,907

(22) Filed: Mar. 17, 2020

(65) Prior Publication Data

US 2020/0304039 A1   Sep. 24, 2020

(30) Foreign Application Priority Data

Mar. 19, 2019 (EP) .................................. 19163833

(51) Int. Cl.
| | | |
|---|---|---|
| H02M 7/483 | (2007.01) | |
| H02M 1/00 | (2006.01) | |
| H02M 7/219 | (2006.01) | |

(52) U.S. Cl.
CPC ............. *H02M 7/483* (2013.01); *H02M 1/00* (2013.01); *H02M 7/219* (2013.01);
(Continued)

(58) Field of Classification Search
CPC ........ H02M 7/219; H02M 5/44; H02M 5/458; H02M 7/483; H02M 1/00; H02M 2001/0054; H02M 2007/4835
See application file for complete search history.

(56) References Cited

U.S. PATENT DOCUMENTS

| | | | | |
|---|---|---|---|---|
| 5,642,275 A | * | 6/1997 | Peng ........................ | H02M 7/49 363/137 |
| 9,030,857 B2 | * | 5/2015 | Martini ................... | H02M 7/49 363/132 |

(Continued)

FOREIGN PATENT DOCUMENTS

| | | |
|---|---|---|
| WO | 2012103936 A1 | 8/2012 |
| WO | 2018099552 A1 | 6/2018 |

OTHER PUBLICATIONS

Kubera Sascha et al.: "Control of Switching Frequency for Modular Multilevel Converters by a Variable Hysteresis Band Modulation", 2016 18th European Conference on Power Electronics and Applications (EPE'16 ECCE Europe) Jointly Owned By IEEE-PELS and EPE Association, Sep. 5, 2016, (Sep. 5, 2016), pp. 1-7, XP032985414, DOI: 10.1109/EPE.2016.7695697 [found Oct. 25, 2016].

(Continued)

*Primary Examiner* — Yusef A Ahmed
(74) *Attorney, Agent, or Firm* — Laurence A. Greenberg; Werner H. Stemer; Ralph E. Locher

(57) ABSTRACT

A method controls a converter having a plurality of switching modules. Each of the switching modules has controllably interruptible semiconductor switches and an energy store. A switching frequency of the switching modules is regulated in consideration of at least one integral limiting value, wherein the at least one integral limiting value is variably determined over time, in accordance with the energy store voltages of the switching modules.

5 Claims, 3 Drawing Sheets

(52) U.S. Cl.
CPC ........ *H02M 7/4835* (2021.05); *H02M 1/0054* (2021.05); *H02M 7/4833* (2021.05)

(56) References Cited

U.S. PATENT DOCUMENTS

| | | | |
|---|---|---|---|
| 10,074,988 B2* | 9/2018 | Oates | H02M 7/483 |
| 10,116,159 B1* | 10/2018 | Li | H02J 3/32 |
| 2008/0310205 A1* | 12/2008 | Hiller | H02M 7/483 363/131 |
| 2010/0067266 A1* | 3/2010 | Dommaschk | H02M 7/483 363/64 |
| 2012/0007571 A1* | 1/2012 | Huisman | H02M 7/483 323/271 |
| 2012/0068555 A1* | 3/2012 | Aiello | H02M 7/483 307/115 |
| 2012/0127766 A1* | 5/2012 | Crookes | H02J 3/36 363/126 |
| 2013/0099572 A1* | 4/2013 | Norrga | H02M 7/483 307/43 |
| 2013/0234681 A1* | 9/2013 | Aiello | H02M 1/12 323/208 |
| 2013/0279211 A1* | 10/2013 | Green | H02J 7/02 363/35 |
| 2013/0308235 A1* | 11/2013 | Davies | H02H 7/1257 361/62 |
| 2014/0016379 A1* | 1/2014 | Yamamoto | H02M 7/483 363/37 |
| 2015/0162848 A1* | 6/2015 | Harnefors | H02M 7/49 363/78 |
| 2015/0171726 A1* | 6/2015 | Singh Riar | H02M 7/06 363/65 |
| 2015/0280605 A1* | 10/2015 | Zhang | H02M 7/219 363/127 |
| 2015/0288287 A1* | 10/2015 | Madawala | H02M 7/483 363/21.01 |
| 2015/0340967 A1* | 11/2015 | Jiang-Hafner | H02M 1/12 363/39 |
| 2015/0372611 A1* | 12/2015 | Hiller | H02M 7/797 363/163 |
| 2016/0056728 A1* | 2/2016 | Zhang | H02M 7/483 363/127 |
| 2016/0149508 A1* | 5/2016 | Choi | H02J 3/36 363/35 |
| 2016/0233762 A1* | 8/2016 | Mathew | H02M 7/49 |
| 2016/0248321 A1* | 8/2016 | Srivastava | H02M 3/22 |
| 2016/0308357 A1* | 10/2016 | Yuan | H02J 3/01 |
| 2017/0054294 A1* | 2/2017 | Lyu | H02J 3/01 |
| 2017/0163171 A1* | 6/2017 | Park | H02M 7/483 |
| 2017/0271997 A1* | 9/2017 | Herold | H02M 7/4833 |
| 2018/0034358 A1* | 2/2018 | Geske | H03K 17/165 |
| 2018/0062536 A1* | 3/2018 | Mondal | H02M 7/48 |
| 2018/0138826 A1* | 5/2018 | Jimichi | H02M 1/32 |
| 2018/0233915 A1* | 8/2018 | Spahic | H02J 7/0013 |
| 2019/0165693 A1* | 5/2019 | Malipaard | H02M 7/003 |
| 2019/0326770 A1* | 10/2019 | Ding | H02M 7/4835 |
| 2019/0363644 A1* | 11/2019 | Li | H02M 7/49 |
| 2020/0076321 A1* | 3/2020 | Ding | H02J 7/022 |
| 2020/0235675 A1* | 7/2020 | Dallmer-Zerbe | H02M 7/4835 |
| 2020/0343717 A1* | 10/2020 | Kontos | H02H 1/0007 |
| 2021/0057911 A1* | 2/2021 | Pieschel | H02J 3/1814 |

OTHER PUBLICATIONS

Kamran Sharifabadi et al.: "Design, Conliul and Application of Modular Multilevel Converters for HVDC Transmission Systems—Modulation and Submodule Energy Balancing", Oct. 17, 2016 (Oct. 17, 2016), XP055614433, URL:https://ieeexplore.ieee.org/book/7601527 [found on the Internet Aug. 21, 2019].

* cited by examiner

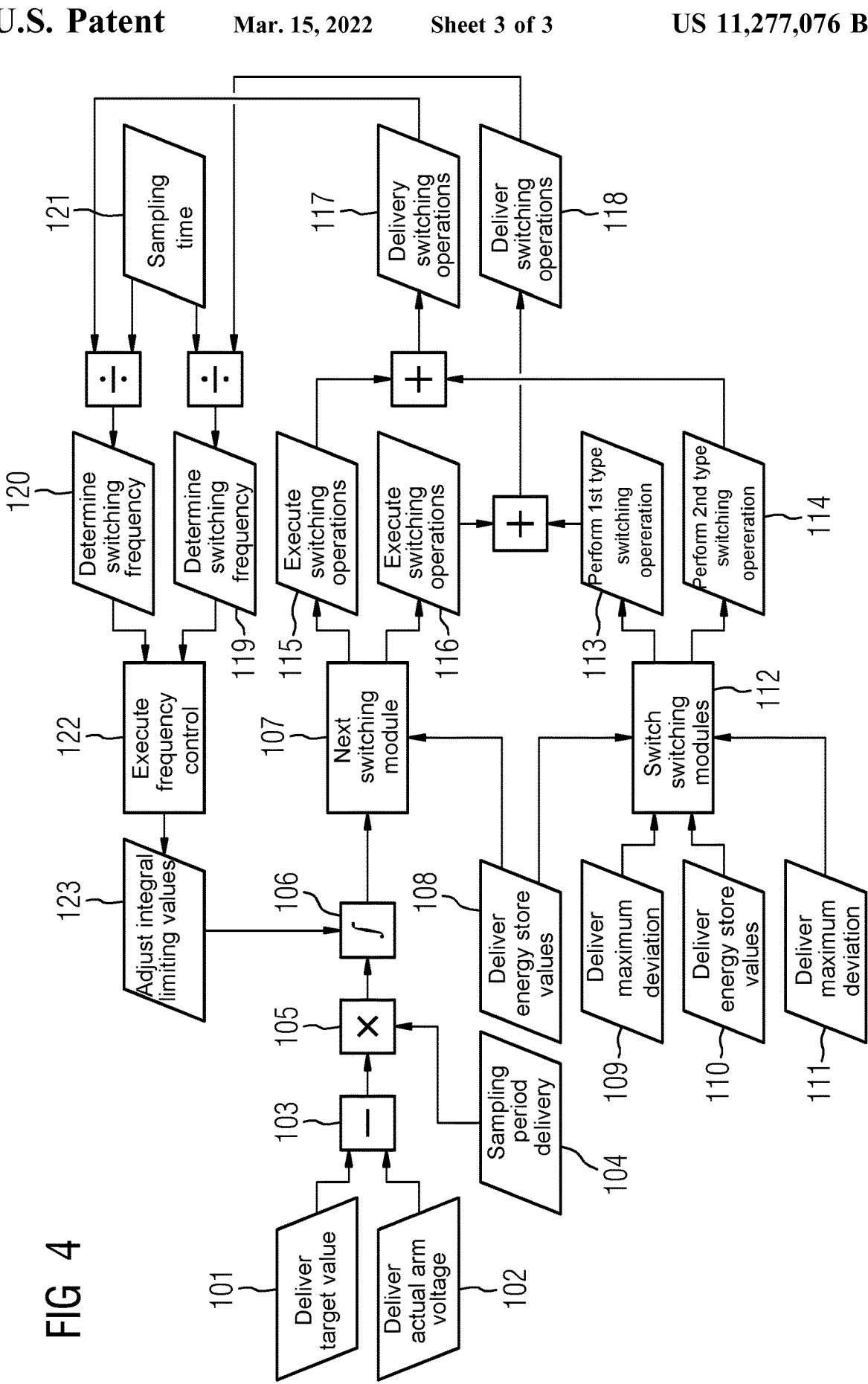

CONVERTER AND METHOD FOR THE CONTROL THEREOF

CROSS-REFERENCE TO RELATED APPLICATION

This application claims the priority, under 35 U.S.C. § 119, of European Patent Application EP19163833, filed Mar. 19, 2019; the prior application is herewith incorporated by reference in its entirety.

BACKGROUND OF THE INVENTION

Field of the Invention

The invention relates to a method for controlling a converter with a plurality of switching modules, each of which contains controllably interruptible semiconductor switches and an energy store.

A method of this type is known from international patent disclosure WO 2012/103936 A1, corresponding to U.S. patent publication No. 2013/0308235. In each converter arm of the known converter, wherein the converter arms respectively extend between one of the DC voltage poles of the converter assembly and one of the AC voltage terminals, two-pole switching modules of a first type, in the form of full-bridge switching modules, and two-pole switching modules of a second type, in the form of half-bridge switching modules, are arranged.

Customarily, for the control of the converter, a target voltage value is specified, which predefines the arm voltage to be set on the converter arm. Correspondingly, the target voltage value is converted by means of a control apparatus of the converter assembly into actuation signals, which are transmitted to the actuation units of the individual switching modules. Switching operations are triggered in the switching modules, in accordance with the actuation signals. A switching operation alters a switching state of the switching module by the appropriate switching of the semiconductor switches. Customarily, the energy store of the respective switching module is switched into the current path (switch-on of the switching module) or is bridged (switch-off of the switching module). It is known that half-bridge switching modules, in comparison with full-bridge switching modules, permit lower power losses in the operation of the converter. Moreover, each switching operation generates additional switching losses.

If switching modules of two different types are employed in one and the same converter, the simultaneous regulation or control of the two switching module types constitutes a particular challenge. In particular, the control method is required to ensure the energy balance of both switching module types.

SUMMARY OF THE INVENTION

The object of the invention is the disclosure of an above-mentioned method which permits the most reliable and low-loss operation possible of the converter.

This object is fulfilled by the generic method, wherein a switching frequency of the switching modules is regulated in consideration of at least one integral limiting value, wherein the at least one integral limiting value is variably determined over time, in accordance with the energy store voltages of the switching modules. The switching frequency of the switching modules is thus controlled according to the invention. By means of switching frequency control, it is achieved that switching losses in the converter, and thus the thermal loading of the converter, is maintained within anticipated or predefined design limits. Switching frequency control can particularly comprise control of an average switching frequency on one of the converter arms or one of the converter branches, wherein a converter branch extends between the two DC voltage poles, and contains two converter arms. The average switching frequency can thus be defined as follows. Firstly, a time interval is defined, which is employed as a switching period, within the meaning of a moving average. The number of switch-on operations on all the affected switching modules within one switching period is then determined. Moreover, the number of switch-off operations on the affected switching modules within the switching period is determined. The two values thus determined are divided by the value $2*n$, where n is the number of affected switching modules, for example the number of switching modules in one converter branch. The switching frequency is controlled in consideration of an integral limiting value. Appropriately, this consideration signifies that, in the event of an overshoot or undershoot of the integral limiting value, the switching frequency of the switching modules is increased. In particular, two integral limiting values—an upper integral limiting value and a lower integral limiting value—can be defined. The upper and lower integral limiting value can be determined, for example, as follows. Firstly, a voltage deviation is calculated as the difference between a target voltage value and an actual voltage value determined. The actual voltage value, appropriately, is a sum of the measured energy store voltages of the switching modules, i.e. the voltages of all the switched-on switching modules which are present on the respective energy stores of the switching modules (in the relevant converter arm or branch). The voltage deviation is then integrated over time (appropriately, by means of a sum determined over sampling time points). It should be observed that the voltage error value, and thus also the integral, can assume both positive and negative values. The upper integral limiting value defines the maximum permissible value of the integral, and the lower integral limiting value defines the minimum permissible value of the integral. In this context, the term "permissible" signifies that, in the event of an overshoot of the upper integral limiting value, at least one switched-off switching module is switched on or, in the case of two-pole switchable switching modules (such as full-bridge switching modules), a negatively switched-in switching module is switched off (blocked). In the event of an undershoot of the lower integral limiting value, conversely, at least one switched-on switching module is switched off (or, in the case of full-bridge switching modules, a switching module is switched-in negatively). The two integral limiting values, or the difference between the latter, thus define a permissible voltage deviation range. The greater the voltage deviation range, the lower the resulting (average) switching frequency. A lower switching frequency is simultaneously associated with a reduction of switching losses in the converter.

According to the invention, it is provided that the at least one integral limiting value is variably determined over time, in accordance with the energy store voltages of the switching modules. This means that the integral limiting value is not statically predefined as a single value, but is progressively redefined during the operation of the converter, by means of calculation and on the basis of measurements. In this manner, the at least one integral limiting value can advantageously be adjusted to further requirements for converter operation. For example, by means of a higher switching frequency, an improved balancing of the switching module voltages or the energy store voltages can be achieved. If such an improved or more accurate balancing is required, correspondingly, for example, the voltage deviation range can thus be reduced by a corresponding redetermination of the integral limiting value(s). In this manner, an improvement in the reliability of the converter can be achieved.

Preferably, by reference to an evaluation of the energy store voltages, the symmetrization thereof is executed by means of additional switching operations. The purpose of the symmetrization or balancing of the switching module voltages or energy store voltages is that individual switching module voltages should be neither too high nor too low. The switching module voltage (of a switched-on switching module) corresponds to the magnitude defined by the energy store voltage on the energy store of the relevant switching module or the zero voltage. If the energy store voltage deviates excessively from a predefined value (for example, an average value), this can thus result in impairments to, or even the failure of the converter, and is therefore to be avoided, By the switch-on or switch-off of a switching module, the energy store thereof can be charged or discharged. Thus, by means of additional switching operations, the switching module voltages can be controlled for the purposes of symmetrization. Full symmetrization is then achieved if all the switching module voltages or the associated energy store voltages are equal, or at least lie within a predefined tolerance range ("dead band").

By means of the temporal variability of the determination of the at least one integral limiting value, an (indirect) influence can be exerted upon symmetrization. It should be observed that, in principle, by means of the integral limiting value, voltage sequences are initially controlled (by means of "basic switching operations"). However, symmetrization can also be indirectly influenced by means of the integral limiting value: the fewer switching modules are switched, the longer the individual switching modules remain in the current path, the greater the variation in the voltage of the switching modules (the energy store voltage) in the current path in comparison with the voltage of the switched-out modules, the greater the voltage difference between switching modules (asymmetry), and the greater the probability of additional switching operations, which can result in the symmetrization or balancing of the switching module groups (switching modules of the same type). To this end, preferably, a voltage difference of the energy store voltages is determined, wherein the voltage difference is compared with a differential limiting value and, if the voltage difference exceeds the differential limiting value, the at least one integral limiting value for switching frequency control, e.g. the upper integral limiting value, is reduced. The voltage difference can be, for example, a difference between an energy store voltage and an average value for all the relevant energy store voltages. By the reduction of the integral limiting value, the switching frequency can be increased, as a result of which more switching operations are executed, as a result of which, in turn, the switching module voltages can be symmetrized more rapidly and more accurately (here again, in an indirect manner: at a higher switching frequency, symmetrization switching operations can be prevented). By means of this measure, it is prevented that, at high switching frequencies, the upper integral limiting value is further increased, which would result in comparatively high voltage deviations.

Appropriately, the switching frequency control is executed by use of a frequency droop. A frequency droop is a characteristic control curve having a partially linear profile, which represents a dependency between the switching frequency and the integral limiting values.

The method described herein is particularly appropriate for a converter having two different types of switching modules. To this end, at least a number of the switching modules are switching modules of a first type, and at least a further number of switching modules are switching modules of a second type, wherein the symmetrization of energy store voltages is executed in consideration of a voltage difference in the energy store voltages of the switching modules of the first type and a voltage difference in the energy store voltages of the switching modules of the second type. The switching modules of different types undergo different loading in the operation of the converter. It is therefore considered advantageous if the switching module voltages of the two types of switching modules are symmetrized separately.

Appropriately, in the operation of the converter assembly, a positive switching module voltage, a negative switching module voltage or a zero voltage are respectively generated on the connection terminals of the switching modules of the first type, and a positive switching module voltage or a zero voltage are respectively generated on the connection terminals of the switching modules of the second type. This configuration or selection of switching module types is particularly advantageous on the grounds that, in this manner, the potential for voltage modulation is extended, as a result of which the energy utilization factor of the converter assembly is improved and transmission losses are reduced (if the converter assembly is employed in an energy transmission installation). A specific example of a switching module of the first type is the full-bridge switching module, and an example of a switching module of the second type is a half-bridge switching module. Naturally, the above-mentioned examples do not exhaustively represent all the examples available.

The switching frequency is preferably executed in consideration of the number of switching modules of the first and second type.

Preferably, the switching modules of the converter arm are controlled with a modulation factor greater than one. All the converter arms of the converter set an arm voltage which, in operation, constitutes a superimposition of a DC voltage UarmDC and an AC voltage UarmAC. The modulation factor M is the ratio of these two components: M=|UarmAC|/UarmDC. By means of a modulation factor greater than one, the energy utilization of the converter assembly can be improved. The arm voltage occasionally falls below the value of zero such that, in these cases, switching modules of the first type are subject to particularly high loading, which is appropriately considered in converter control.

As described above, for switching frequency control, an average switching frequency of the switching modules can be determined. Moreover, the average switching frequency can be filtered by a moving average filter.

The invention further relates to a converter for medium-voltage and high-voltage applications, which contains a plurality of switching modules, each incorporating controllably interruptible semiconductor switches and an energy store, and a control apparatus for controlling the converter.

A converter of this type is known from the above-mentioned document WO 2012/103936 A1.

The object of the invention is the proposal of such a converter which is as reliable and efficient as possible in operation.

According to the invention, this object is fulfilled by a generic converter, the control apparatus of which is configured to execute the method according to the invention.

The advantages of the converter according to the invention proceed in particular from the advantages described with reference to the method according to the invention. In particular, all the characteristics disclosed in the context of the method can also be employed in the converter according to the invention, either in isolation or in combination.

Other features which are considered as characteristic for the invention are set forth in the appended claims.

Although the invention is illustrated and described herein as embodied in a converter and a method for the control thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is a block diagram showing an example of a control apparatus for executing the method according to the invention.

DETAILED DESCRIPTION OF THE INVENTION

Figure 1:
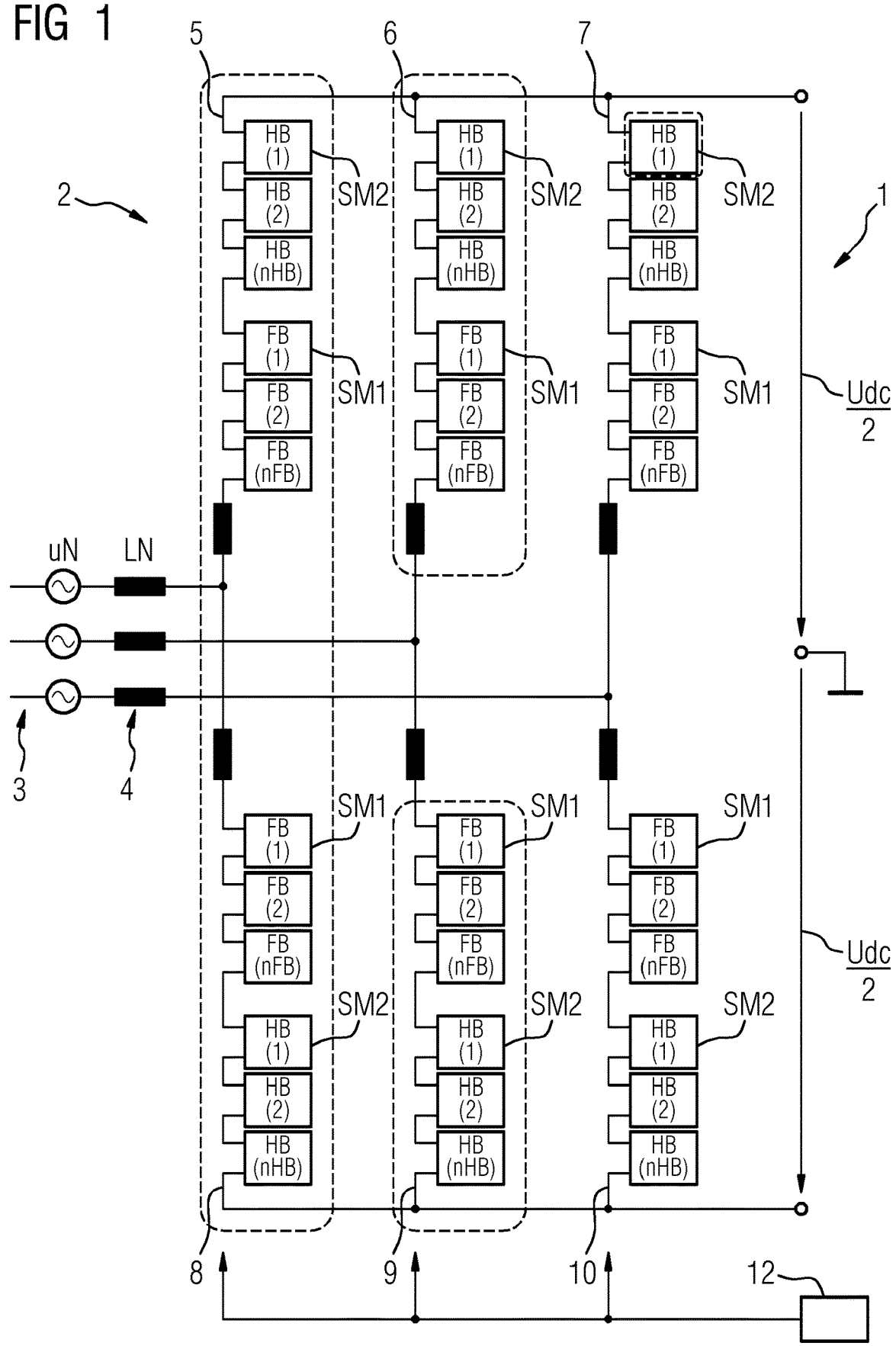
FIG. 1 is a schematic diagram showing an exemplary embodiment of a converter according to the invention.

Referring now to the figures of the drawings in detail and first, particularly to FIG. 1 thereof, there is shown a converter 1. The converter 1 contains semiconductor switches in switching modules, which are combined to constitute a modular multi-level converter (MMC) 2 which, in the example represented, is provided for the conversion of an AC voltage on an AC grid system 3, to which the MMC 2 is connected by means of a network transformer 4 (wherein only the secondary-side windings are diagrammatically represented), into a DC voltage Udc.

The MMC 2 contains six converter arms 5-10, which are interconnected in a double star-connected arrangement. Each of the identically structured converter arms 5-10 contains an arm inductance 11 and a series circuit of two-pole switching modules SM1 of the first type and switching modules SM2 of the second type. In principle, the number of switching modules SM1 or SM2 in each converter branch 5-10 is also discretionary, and can be adapted to the respective application. The switching modules SM1 of the first type, for example, can be full-bridge switching modules, and the switching modules SM2 of the second type, for example, can be half-bridge switching modules, the structure of which is addressed in greater detail in the subsequent FIGS. 2 and 3. Each switching module SM contains controllable semiconductor switches, e.g. IGBTs or similar, an energy store and a control unit, by means of which the semiconductor switches can be actuated. In principle, it is moreover conceivable that the converter assembly 1 contains further types of switching modules.

The converter assembly 1 further contains a central control apparatus 12, which is configured to control the MMC 2 and to actuate the switching modules SM. The control apparatus 12 receives instructions from a superordinate authority with respect to the requisite active power and reactive power, which are converted by the control unit into target values for a number of control parameters. The control parameters can be, for example, an AC-side voltage Uac, an AC-side current Iac, a DC-side current Idc and/or a DC-side voltage Udc. In converter assemblies which are designed in the form of a symmetrical monopole, a voltage between the positive DC voltage pole and the ground potential, Udc+, and a voltage between the negative DC voltage pole and the ground potential, Udc−, are of significance.

Figure 2:
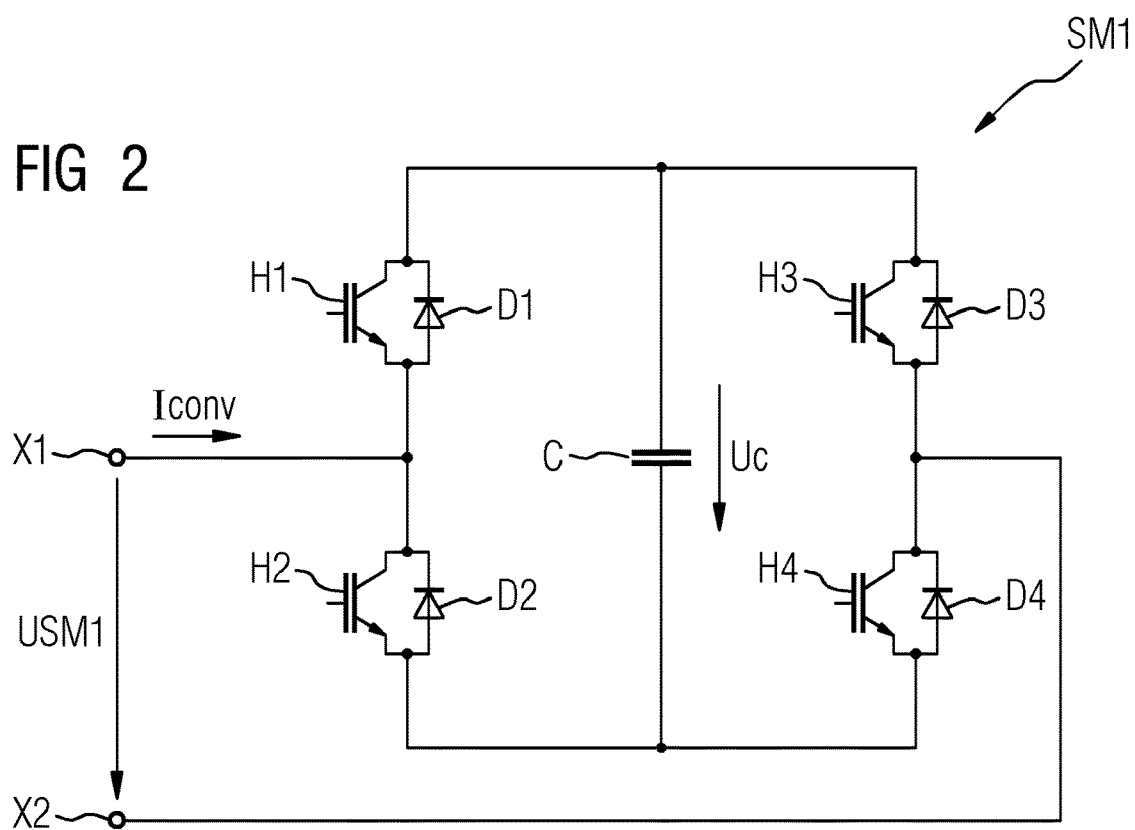
FIG. 2 is a schematic diagram showing an example of a switching module of the first type.

FIG. 2 shows a switching module SM1 of the first type, which is appropriate for the converter according to FIG. 1, and which is connected in a full-bridge circuit. The switching module SM1 contains a first interruptible semiconductor switch H1, to which a first freewheeling diode D1 is connected in an antiparallel arrangement, a second interruptible semiconductor switch H2, to which a second freewheeling diode D2 is connected in an antiparallel arrangement, wherein the first and second semiconductor switches H1, H2 are interconnected in a first semiconductor series circuit, and have the same forward direction. The switching module SM2 further contains a third interruptible semiconductor switch H3, to which a third freewheeling diode D3 is connected in an antiparallel arrangement, and a fourth interruptible semiconductor switch H4, to which a fourth freewheeling diode D4 is connected in an antiparallel arrangement. The third and fourth semiconductor switches H3, H4 are interconnected in a second semiconductor series circuit, and have the same forward direction. The two semiconductor series circuits are arranged in parallel with each other and with an energy store C in the form of a capacitor, on which a capacitor voltage Uc is present. The switching module SM1 further contains a first connection terminal X1, which is arranged between the semiconductor switches H1, H2 of the first semiconductor series circuit, and a second connection terminal X2, which is arranged between the semiconductor switches H3, H4 of the second semiconductor series circuit, By the appropriate actuation of the semiconductor switches H1-4, a switching module voltage USM1 can be generated on the terminals X1, X2 which corresponds to the capacitor voltage Uc, to the negative capacitor voltage −Uc, or to a zero voltage.

Figure 3:
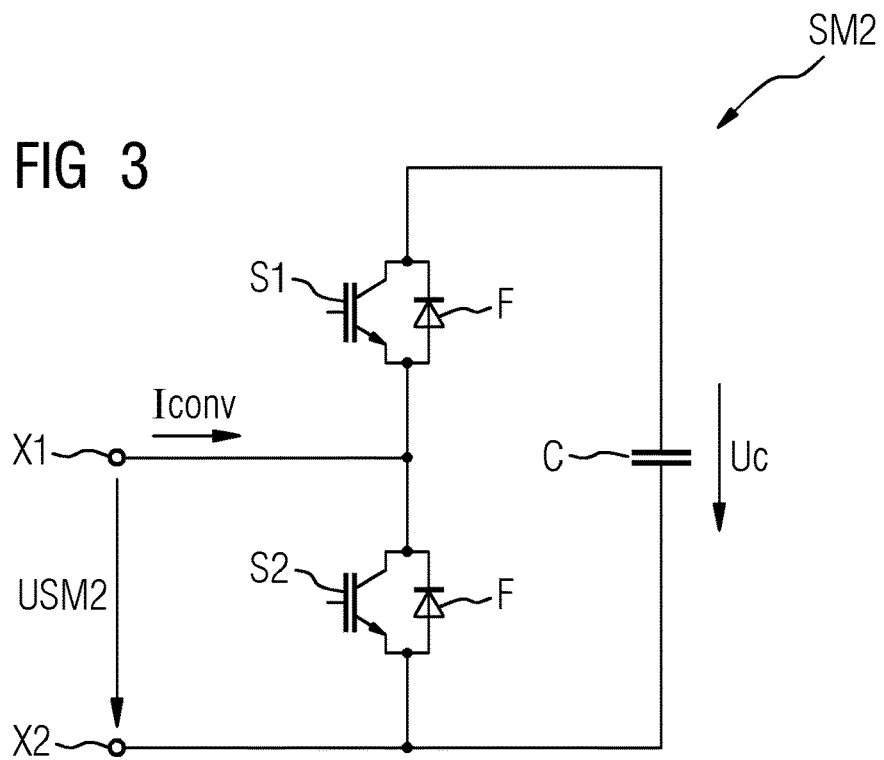
FIG. 3 is a schematic diagram showing an example of a switching module of the second type.

FIG. 3 shows a switching module SM2 of the second type, which is appropriate for the converter according to FIG. 1, and is connected in a half-bridge circuit. In a capacitor branch, a parallel circuit of a first semiconductor switch S1 and a capacitor C is arranged. In a bridge branch between two terminals X1, X2 of the first switching module SM2, a second semiconductor switch is arranged. A freewheeling diode F is connected to each of the two semiconductor switches S1 S2 in an anti-parallel arrangement. By the appropriate actuation of the two semiconductor switches S1, S2, a switching module voltage USM2 can be generated on the terminals X1, X2 which corresponds to the capacitor voltage Uc, or to a zero voltage.

FIG. 4 shows a block sequence diagram for the execution of a method according to the invention, wherein the block sequence diagram is correspondingly translated into blocks or components of the control apparatus of the converter. It is assumed that the converter contains switching modules of a first type and switching modules of a second type (for example, as per the converter according to FIG. 1).

In a first block 101, a target voltage value for the arm voltage of the converter arm is delivered, wherein the arm voltage is the sum of the switching module voltages in the relevant converter arm. In a second block 102, a measured actual arm voltage is delivered. In a differential block 103, a difference between the target voltage value and the actual arm voltage is constituted. In a fourth block 104, a sampling period is delivered. In a fifth block 105, the difference constituted in block 103 is totalized or integrated in accordance with the sampling period. In a sixth block, the integrated value is compared with an upper and a lower integral limiting value. On the basis of this comparison, it is decided, in a seventh block 107, which is the next switching module to be switched on or switched off.

In an eighth block 108, the measured energy store voltages of the switching modules of the first type are delivered. In a ninth block 109, a maximum deviation between one of the energy store voltages of block 108 and an average value of said voltages is delivered. In a tenth block 110, the measured energy store voltages of the switching modules of the second type are delivered. In an eleventh block 111, a maximum deviation between one of the energy store voltages of block 110 and an average value of said voltages is delivered. On the basis of information delivered in blocks 108-111, selected switching modules for a symmetrization of the switching module voltages are switched in block 112. In block 113, additional switching operations for switching modules of the first type and, in block 114, additional switching operations for switching modules of the second type can be provided.

At the same time, in accordance with the selection executed in block 107, in block 115, switching operations of the switching modules of the first type and, in block 116, switching operations of the switching modules of the second type are executed or initiated. For switching modules of the first type, switching operations from blocks 114 and 115 are totalized, and delivered in block 117. Correspondingly, switching operations of the switching modules of the second type from blocks 113 and 116 are totalized, and delivered in block 118. In turn, in block 119 or in block 120, the switching frequencies of switching modules of the first or second type are determined therefrom (in consideration of the sampling time delivered in block 121).

A frequency control is executed in block 122. At the output of block 122, information is delivered as to whether the switching frequency is too high or too low, and whether the switching module voltages or energy store voltages lie within or outside a permissible voltage deviation range. In block 123, on the basis of this information, it is decided by what value the integral limiting values are to be adjusted.

The invention claimed is:

1. A method for controlling a converter having a plurality of switching modules, each of the plurality of switching modules having controllably interruptible semiconductor switches and an energy store, wherein at least a number of the plurality of switching modules being switching modules of a first type, wherein the first type being full-bridge switching modules, and at least a further number of the plurality of switching modules being switching modules of a second type, wherein the second type being half-bridge switching modules, the method comprises the steps of:
regulating a switching frequency of the plurality of switching modules based on at least one integral limiting value, wherein the at least one integral limiting value is variably determined over time based on energy store voltages of the plurality of switching modules;
executing, by means of additional switching operations, by reference to an evaluation of the energy store voltages, a symmetrization of the energy store voltages, the symmetrization of the energy store voltages being executed based on a voltage difference in the energy store voltages of the switching modules of the first type and a voltage difference in the energy store voltages of the switching modules of the second type, wherein the voltage difference of the switching modules of either of the first or second types is a difference between an energy store voltage of a respective switching module and an average value for all of the energy store voltages of the switching modules of the same type;
comparing the voltage difference of either of the first or second types with a differential limiting value and, if the voltage difference exceeds the differential limiting value, reducing the at least one integral limiting value for switching frequency control, wherein for switching the frequency control, determining an average switching frequency of the plurality of switching modules, and filtering the average switching frequency by means of a moving average filter; and
generating, during an operation of the converter assembly, a positive switching module voltage, a negative switching module voltage or a zero voltage on connection terminals of the full-bridge switching modules, and generating a positive switching module voltage or a zero voltage on connection terminals of the half-bridge switching modules.

2. The method according to claim 1, which further comprises executing the switching frequency control by means of a frequency droop.

3. The method according to claim 1, which further comprises executing the switching frequency based on the number of the switching modules of the first and second types.

4. The method according to claim 1, which further comprises controlling the plurality of switching modules of a converter arm with a modulation factor greater than one.

5. A converter for medium-voltage applications and high-voltage applications, the converter comprising:
a plurality of switching modules each having controllably interruptible semiconductor switches and an energy store, wherein at least a number of said plurality of switching modules being switching modules of a first type, wherein said first type being full-bridge switching modules, and at least a further number of said plurality of switching modules being switching modules of a second type, wherein said second type being half-bridge switching modules; and
a controller for controlling the converter, said controller configured to:
regulate a switching frequency of said plurality of switching modules based on at least one integral limiting value, wherein the at least one integral limiting value is variably determined over time based on energy store voltages of said plurality of switching modules;
execute, by means of additional switching operations, by reference to an evaluation of the energy store voltages, a symmetrization of the energy store voltages, the symmetrization of the energy store voltages being executed based on a voltage difference in the energy store voltages of said switching modules of said first type and a voltage difference in the energy store voltages of said switching modules of said second type, wherein the voltage difference of said switching modules of either said first or second types is a difference between an energy store voltage of a respective switching module and an average value for all of the energy store voltages of said switching modules of the same type;

compare the voltage difference of either of the first or second types with a differential limiting value and, if the voltage difference exceeds the differential limiting value, reducing the at least one integral limiting value for switching frequency control, wherein for switching the frequency control, determining an average switching frequency of said plurality of switching modules, and filtering the average switching frequency by means of a moving average filter; and generate, during an operation of the converter, a positive switching module voltage, a negative switching module voltage or a zero voltage on connection terminals of said full-bridge switching modules, and generating a positive switching module voltage or a zero voltage on connection terminals of said half-bridge switching modules.

\* \* \* \* \*